United States Patent
Maloney et al.

(10) Patent No.: US 7,347,452 B2
(45) Date of Patent: *Mar. 25, 2008

(54) TENSION SENSING ASSEMBLY

(75) Inventors: David L. Maloney, Barrington, IL (US); Guy A. Wojtanek, West Chicago, IL (US); Gary R. Grieb, Lake Orion, MI (US); David G. Hlavaty, Northville, MI (US); James L. Webber, Shelby Township, MI (US); Michael T. Moury, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 336 days.

This patent is subject to a terminal disclaimer.

(21) Appl. No.: 10/829,758

(22) Filed: Apr. 22, 2004

(65) Prior Publication Data
US 2004/0245761 A1 Dec. 9, 2004

Related U.S. Application Data

(60) Provisional application No. 60/464,761, filed on Apr. 23, 2003.

(51) Int. Cl.
*B60R 22/00* (2006.01)
(52) U.S. Cl. .................. 280/801.1; 180/268; 73/862.69
(58) Field of Classification Search ............. 180/268; 280/801.1; 324/207.2, 207.21; 73/862.391, 73/862.69, 862.637, 779
See application file for complete search history.

(56) References Cited

U.S. PATENT DOCUMENTS

| 3,618,378 A | 11/1971 | Shull et al. |
| 3,784,972 A | 1/1974 | Hults |
| 3,817,093 A | 6/1974 | Williams |
| 3,868,662 A | 2/1975 | Russell, Jr. |
| 4,424,509 A | 1/1984 | Andres et al. |
| 4,574,911 A | 3/1986 | North |
| 4,677,861 A | 7/1987 | Bartholomew |
| 4,742,886 A | 5/1988 | Sato |
| 4,805,467 A | 2/1989 | Bartholomew |
| 4,943,087 A | 7/1990 | Sasaki |
| 4,979,400 A | 12/1990 | Bartholomew |
| 5,060,977 A | 10/1991 | Saito |
| 5,087,075 A | 2/1992 | Hamaue |
| 5,181,739 A | 1/1993 | Bauer et al. |
| 5,271,129 A | 12/1993 | Clarke et al. |

(Continued)

FOREIGN PATENT DOCUMENTS

WO    WO 99/55559    11/1999

OTHER PUBLICATIONS

"Magnetic Field Sensors for Magnetic Position Sensing in Automotive Applications", Joseph P. Heremans, General Motors Research and Development Corporation, Apr. 1, 1997.

*Primary Examiner*—Paul N. Dickson
*Assistant Examiner*—Tiffany L. Webb
(74) *Attorney, Agent, or Firm*—Douglas D. Fekete

(57) ABSTRACT

A tension sensing assembly for a seat restraint system in a vehicle is provided. The tension sensing assembly comprises an anchor, a movable mechanism configured to be secured to a portion of a buckle, at least one magnet coupled to the movable mechanism, a Hall effect sensor coupled to the anchor, at least one tension spring secured to the anchor at a first end and the movable mechanism at a second end. The movable mechanism moves the at least one magnet relative to the Hall effect sensor to induce an output from the Hall effect sensor. The output indicates a tension level being applied to the tension sensing assembly.

16 Claims, 4 Drawing Sheets

U.S. PATENT DOCUMENTS

| | | | |
|---|---|---|---|
| 5,309,135 | A | 5/1994 | Langford |
| 5,364,129 | A | 11/1994 | Collins et al. |
| 5,454,591 | A | 10/1995 | Mazur et al. |
| 5,494,311 | A | 2/1996 | Blackburn et al. |
| 5,570,903 | A | 11/1996 | Meister et al. |
| 5,570,932 | A | 11/1996 | Collins et al. |
| 5,583,476 | A | 12/1996 | Langford |
| 5,590,904 | A | 1/1997 | Ellis et al. |
| 5,605,348 | A | 2/1997 | Blackburn et al. |
| 5,618,056 | A | 4/1997 | Schoos et al. |
| 5,636,864 | A | 6/1997 | Hori |
| 5,728,953 | A | 3/1998 | Beus et al. |
| 5,732,974 | A | 3/1998 | Sayles |
| 5,775,618 | A | 7/1998 | Krambeck |
| 5,831,172 | A | 11/1998 | Kidd |
| 5,871,232 | A | 2/1999 | White |
| 5,960,523 | A | 10/1999 | Husby et al. |
| 5,965,827 | A | 10/1999 | Stanley et al. |
| 5,996,421 | A | 12/1999 | Husby |
| 6,081,759 | A | 6/2000 | Husby et al. |
| 6,161,439 | A | 12/2000 | Stanley |
| 6,205,868 | B1 | 3/2001 | Miller |
| 6,209,915 | B1 | 4/2001 | Blakesley |
| 6,230,088 | B1 * | 5/2001 | Husby .................. 701/45 |
| 6,301,977 | B1 | 10/2001 | Stojanovski |
| 6,336,371 | B1 | 1/2002 | O'Boyle |
| 6,363,793 | B2 | 4/2002 | O'Boyle |
| 6,382,667 | B1 | 5/2002 | Aoki |
| 6,400,145 | B1 | 6/2002 | Chamings et al. |
| 6,454,304 | B1 | 9/2002 | Steffens, Jr. |
| 6,502,860 | B1 * | 1/2003 | Siegfried et al. ........ 280/801.1 |
| 6,508,114 | B2 | 1/2003 | Lawson |
| 6,520,540 | B1 | 2/2003 | Siegfried et al. |
| 6,554,318 | B2 | 4/2003 | Kohut et al. |
| 6,679,524 | B2 * | 1/2004 | Greib et al. ............ 280/801.1 |
| 6,725,727 | B2 | 4/2004 | Rogers, Jr. et al. |
| 6,729,194 | B2 * | 5/2004 | Kaijala et al. ........... 73/862.69 |
| 6,746,048 | B2 | 6/2004 | Tajima et al. |
| 6,749,038 | B2 * | 6/2004 | Sullivan et al. ............ 180/268 |
| 6,776,056 | B2 * | 8/2004 | Garver et al. ................ 73/862 |
| 6,820,458 | B2 * | 11/2004 | Grzic ........................ 73/1.15 |
| 2002/0104383 | A1 | 8/2002 | Chamings et al. |
| 2003/0024326 | A1 | 2/2003 | Blakesley et al. |
| 2003/0150283 | A1 * | 8/2003 | Stanley et al. ......... 73/862.391 |

* cited by examiner

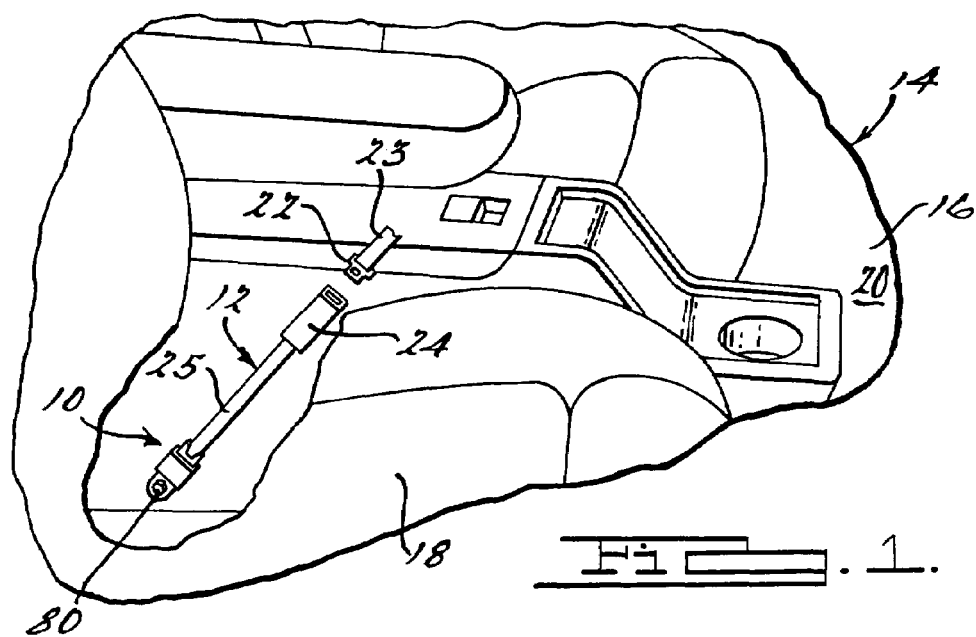
FIG. 1.
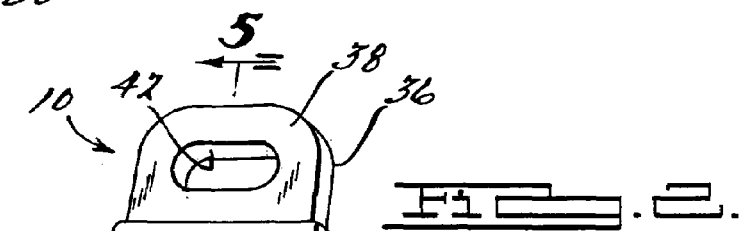
FIG. 2.
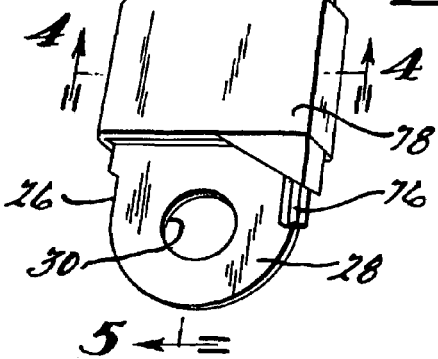
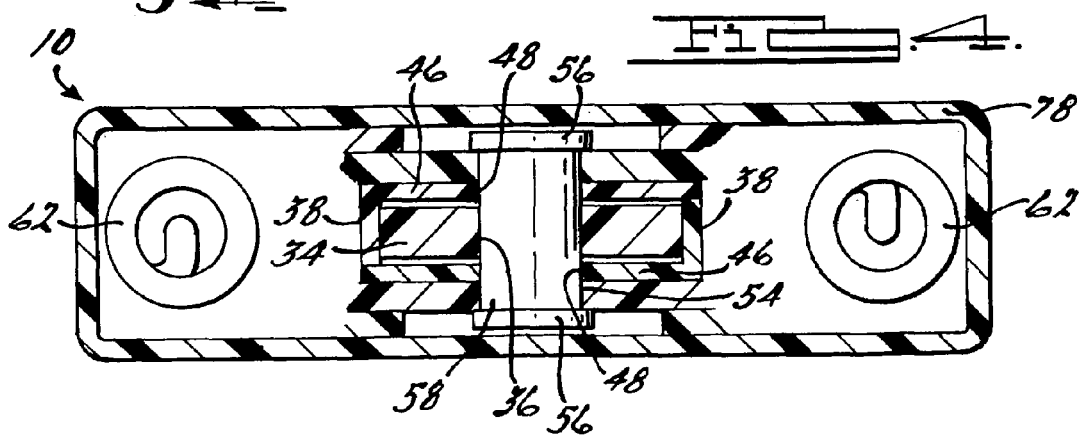
FIG. 4.

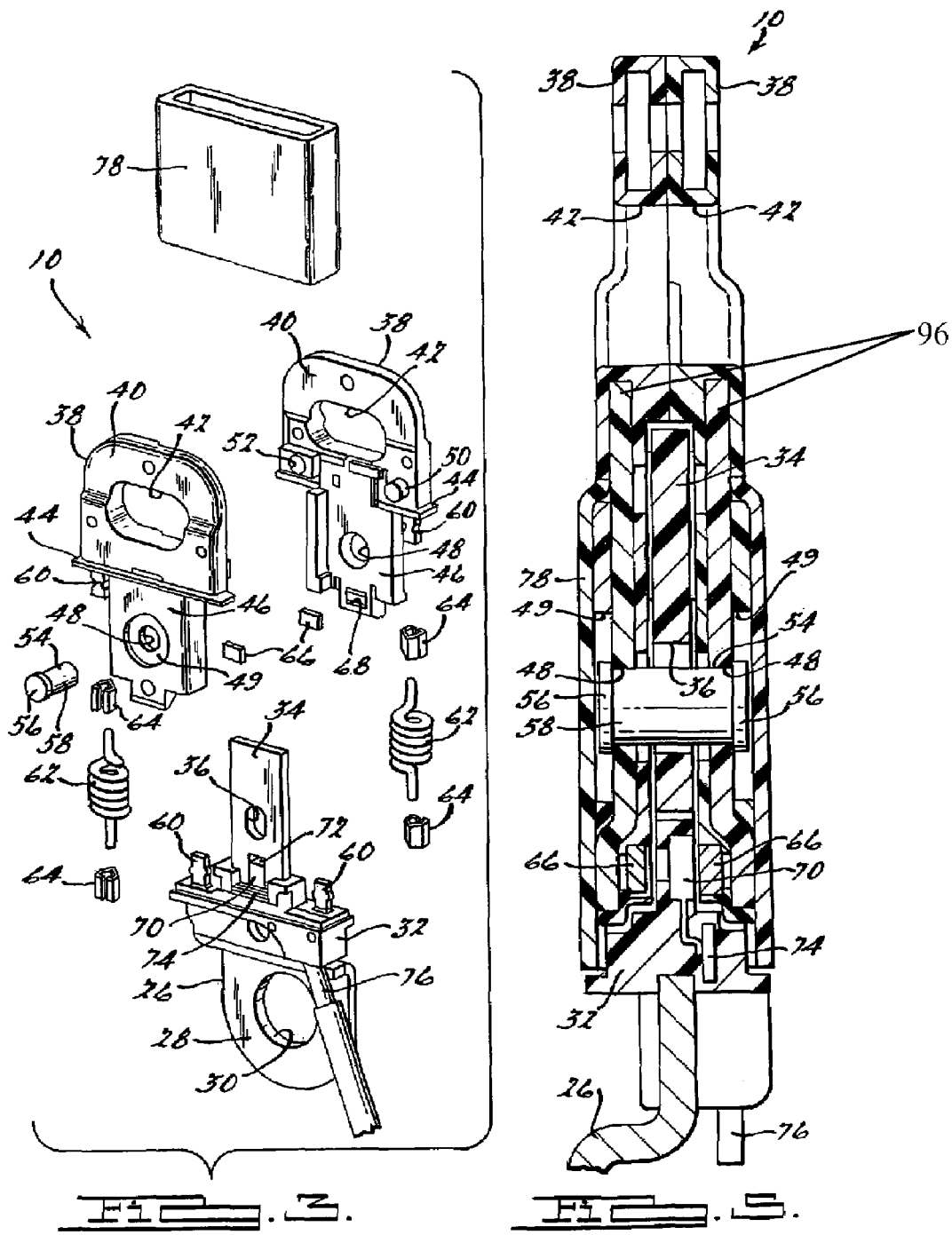

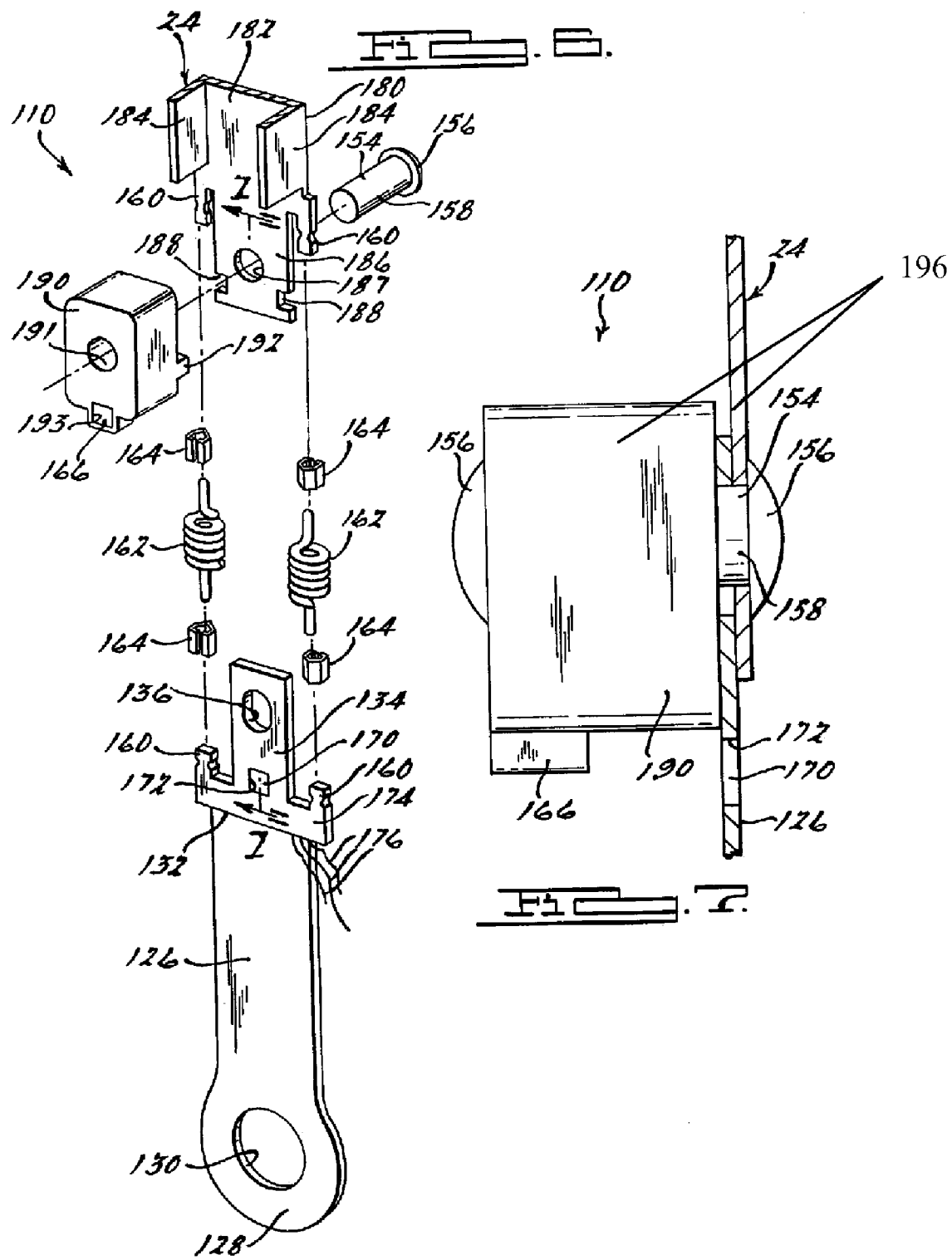

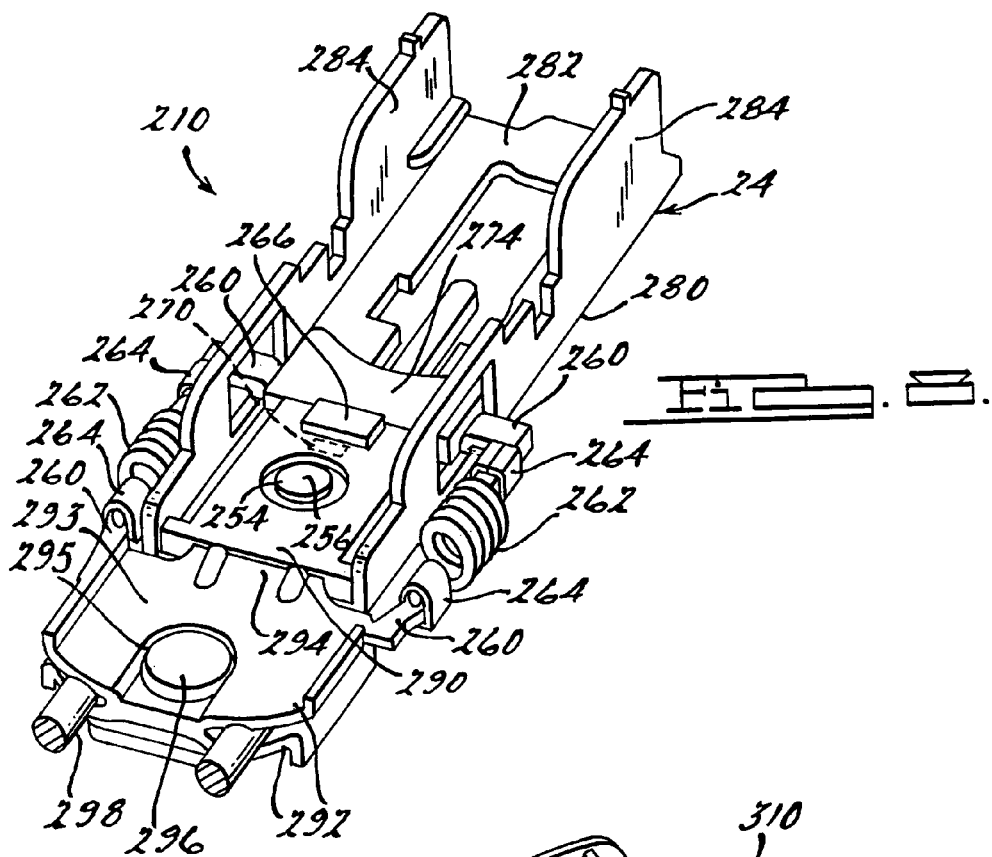
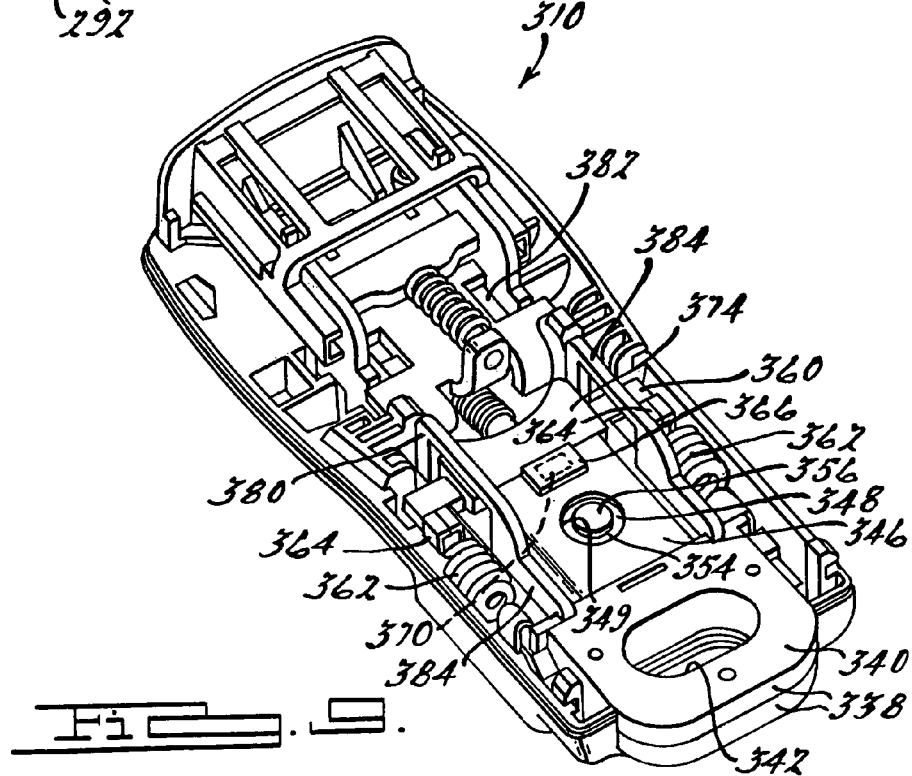

TENSION SENSING ASSEMBLY

CROSS-REFERENCE TO RELATED APPLICATION(S)

The present invention claims the priority date of copending U.S. Provisional Patent Application Ser. No. 60/464,761, filed Apr. 23, 2003.

TECHNICAL FIELD

The present invention relates generally to seat restraint systems for vehicles and, more particularly, to a tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraints.

Conventional belt tension sensors typically include compression springs for sensing capability. However, these compression springs do not provide adequate sensing capability at low tension levels. In addition, these tension sensors may exhibit rattle noise and have a relatively large package size. Further, these tension sensors may be subject to environmental contamination. Additionally, these tension sensors have an inability to be packaged on either an inboard side or outboard side of a passenger seat of the vehicle. Also, these tension sensors are not compatible with buckle pretensioners.

Therefore, it is desirable to provide an assembly for sensing tension in a seat restraint system of a vehicle. It is also desirable to provide an assembly for sensing tension in a seat restraint system in a vehicle that allows a control module to decide on deployment of the inflatable restraints. It is further desirable to provide an assembly for sensing tension in a seat restraint system in a vehicle that provides an indication of low-tension forces in the seat restraint system. It is still further desirable to provide an assembly for sensing tension in a seat restraint system having a smaller package size. Therefore, there is a need in the art to provide a tension sensing assembly that meets these desires.

SUMMARY OF THE INVENTION

Accordingly, the present invention is a tension sensing assembly for a seat restraint system in a vehicle including at least one anchor for operative connection to vehicle structure. The tension sensing assembly also includes a movable mechanism for operative connection to a buckle assembly of the seat restraint system. The tension sensing assembly includes at least one magnet operatively supported by the movable mechanism and a Hall effect sensor operatively supported by the at least one anchor and cooperable with the at least one magnet. The tension sensing assembly further includes at least one tension spring extending between the at least one anchor and the movable mechanism. The movable mechanism moves the at least one magnet relative to the Hall effect sensor to change an output of the Hall effect sensor to indicate a tension level in the seat restraint system when the at least one tension spring is stretched.

One advantage of the present invention is that a new tension sensing assembly is provided for a seat restraint system in a vehicle. Another advantage of the present invention is that the tension sensing assembly may be mounted on a buckle or inboard side of the vehicle or an anchor or outboard side of the vehicle. Yet another advantage of the present invention is that the tension sensing assembly incorporates at least one tension spring that provides low tension sensing capability (0 to 30 lb.). Still another advantage of the present invention is that the tension sensing assembly is compatible with a buckle pretensioner. A further advantage of the present invention is that the tension sensing assembly provides a reduction in overall package size and reduces the amount of parts. Yet a further advantage of the present invention is that the tension sensing assembly has a reduced number of wire-harness breakouts and electrical connectors. Still a further advantage of the present invention is that the tension sensing assembly has reduced component, system, and material costs. Another advantage of the present invention is that the tension sensing assembly reduces rattle noise. Yet another advantage of the present invention is that the tension sensing assembly has a plastic overmold to prevent environmental contamination. Still another advantage of the present invention is that the tension sensing assembly improves performance by eliminating friction caused by webbing sliding against sensor body. A further advantage of the present invention is that the tension sensing assembly may incorporate a cable attachment to provide flexible presentation of the buckle assembly and allows for attachment to a pretensioner, if required. Yet a further advantage of the present invention is that the tension sensing assembly may incorporate a flexible cable to reduce bending moment due to inboard loading and allows the tension sensing assembly to stay in line with the buckle assembly.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a tension sensing assembly, according to the present invention, illustrated in operational relationship with a seat restraint system of a vehicle.

FIG. 2 is a perspective view of the tension sensing assembly of FIG. 1.

FIG. 3 is an exploded perspective view of the tension sensing assembly of FIGS. 1 and 2.

FIG. 4 is a sectional view taken along line 4-4 of FIG. 2.

FIG. 5 is a sectional view taken along line 5-5 of FIG. 2.

FIG. 6 is an exploded perspective view of another embodiment, according to the present invention, of the tension sensing assembly of FIG. 1.

FIG. 7 is a partial fragmentary elevational view of a portion of the tension sensing assembly of FIG. 6.

FIG. 8 is a perspective view of yet another embodiment, according to the present invention, of the tension sensing assembly of FIG. 1.

FIG. 9 is a perspective view of still another embodiment, according to the present invention, of the tension sensing assembly of FIG. 1.

DESCRIPTION OF THE PREFERRED EMBODIMENT

Referring to the drawings and in particular FIG. 1, one embodiment of a tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure such as a floorpan (not shown) in an occupant compartment 20 of the vehicle body 16. In this embodiment, the seat 18 is a front seat of the vehicle 14. It should be appreciated that the seat 18 could be a rear, second row, or third row seat for the vehicle 14.

Referring to FIG. 1, the vehicle 14 includes the seat restraint system 12 for restraining an occupant (not shown) in the seat 18. The seat restraint system 12 includes a latch tongue or plate 22 connected to belt webbing 23 at an end of either one of a lap belt, shoulder belt, or both which have another end connected to a retractor (not shown). The seat restraint system 12 also includes a buckle assembly 24 for receiving the latch plate 22. The buckle assembly 24 is connected by suitable means such as belt webbing 25 to the tension sensing assembly 10. The tension sensing assembly 10 is connected to vehicle structure in a manner to be described. It should be appreciated that the tension sensing assembly 10 may be mounted on either an inboard side or outboard side of the seat 18 of the vehicle 14. It should also be appreciated that the latch plate 22 is engageable and disengageable with the buckle assembly 24. It should further be appreciated that, except for the tension sensing assembly 10, the seat restraint system 12 and vehicle 14 are conventional and known in the art.

Referring to FIGS. 1 through 5, the tension sensing assembly 10, according to the present invention, includes a lower anchor 26 extending longitudinally. The lower anchor 26 has an anchor portion 28 that is generally planar and rectangular in shape. The anchor portion 28 has a mounting aperture 30 extending therethrough to act as a mounting hole for a function to be described. The lower anchor 26 has a base portion 32 extending generally perpendicular to the anchor portion 28 and a tongue portion 34 extending generally longitudinally from the base portion 32. The base portion 32 and tongue portion 34 are generally rectangular in shape. The tongue portion 34 has a slot 36 extending therethrough for a function to be described. The lower anchor 26 is made of a metal material. It should be appreciated that the anchor portion 28 is offset from the tongue portion 34 and can be customized if required for in-vehicle packaging.

The tension sensing assembly 10 includes a moveable mechanism 96 comprising at least one, preferably a pair of upper anchors 38 extending longitudinally. Each upper anchor 38 has an anchor portion 40 that is generally planar and rectangular in shape. The anchor portion 40 has a mounting aperture 42 extending therethrough to act as a mounting hole for a function to be described. Each upper anchor 38 has a base portion 44 extending generally perpendicular to the anchor portion 40 and a tongue portion 46 extending generally longitudinally from the base portion 44. The base portion 44 and tongue portion 46 are generally rectangular in shape. The tongue portion 46 has an aperture 48 extending therethrough and a counterbore 49 disposed about the aperture 48 for a function to be described. Each upper anchor 38 has a projection 50 on one side of the base portion 40 and a cavity 52 on the other side of the base portion 40 to locate the upper anchors 38 relative to each other. Each upper anchor 38 is made of a metal material and overmolded with a plastic material to protect bearing surface from environmental contamination.

The tension sensing assembly 10 includes a fastener 54 to secure the upper anchors 38 and lower anchor 26 together. The fastener 54 is of a rivet type having a head portion 56 and a shaft portion 58. The shaft portion 58 extends through the apertures 48 in the upper anchors 38 and the slot 36 in the lower anchor 26. The head portion 56 is disposed in the counterbore 49 of one of the upper anchor 38 and the free end of the shaft portion 58 is expanded to form another head portion 56 that is disposed in the counterbore 49 of the other upper anchor 38. The fastener 54 is made of a metal material. It should be appreciated that the fastener 54 is fixed to the upper anchors 38 and the slot 36 in the lower anchor 26 allows for longitudinal motion of the lower anchor 26 relative to the upper anchors 38. It should be appreciated that the fastener 42 is conventional and known in the art.

The tension sensing assembly 10 includes a plurality of spring mounts 60 extending longitudinally from the upper anchors 38 and the lower anchor 26. Preferably, each upper anchor 38 has one spring mount 60 on one side on the base portion 40 and the lower anchor 26 has a pair of spring mounts 60 spaced laterally on the base portion 28.

The tension sensing assembly 10 also includes at least one, preferably a plurality of, more preferably two, springs 62 extending between the upper anchors 38 and the lower anchor 26. The springs 62 are tuned to a predetermined force for a high-tension condition to have an output of approximately eight pounds (8 lb.) to approximately thirty pounds (30 lb.). The springs 62 are of a coil type having a first end connected to the spring mounts 60 of the lower anchor 26 by suitable means such as spring crimps 64 and a second end connected to the spring mounts 60 of the upper anchors 38 by suitable means such as spring crimps 64. The springs 62 are made of a spring material. It should be appreciated that the springs 62 are tensioned when the lower anchor 26 is moved relative to the upper anchors 38.

Referring to FIGS. 3 and 4, the tension sensing assembly 10 includes at least one, preferably a plurality, more preferably a pair, of magnet 66 disposed in recesses 68 of the upper anchors 38. One of the magnets 66 is disposed in the recess 68 on the tongue portion 46 of one of the upper anchors 38 and the other magnet 66 is disposed in the recess 68 on the tongue portion 46 of the other one of the upper anchors 38. The magnets 66 are spaced laterally from each other. The magnets 66 are mounted on the tongue portions 46 of the upper anchors 38, preferably molded or die-cast into the tongue portions 46 of the upper anchors 38 and charged during assembly.

The tension sensing assembly 10 also includes a Hall effect sensor 70 disposed in a recess 72 of the tongue portion 34 of the lower anchor 26. The Hall effect sensor 70 is spaced longitudinally between the magnets 66 and is mounted on a printed circuit board 74 connected to the base portion 32 and is potted or encapsulated and connected by electrical leads or wires 76 to a source of power such as a controller (not shown) of the vehicle. The Hall effect sensor 70 and magnets 66 are moved relative to each other during a high-tension condition. It should be appreciated that the magnets 66 and Hall effects sensors 70 are moved relative to each other in a pull-pull arrangement. It should also be appreciated that the position of the magnets 66 relative to the hall effect sensors 70 changes the output signal. It should be appreciated that the Hall effect sensor 70 is preferably centered between the magnets 66.

The tension sensing assembly 10 includes a cover 78 disposed over the tongue portions 34 and 46 of the upper anchors 38 and the lower anchor 26. The cover 78 is a generally rectangular tubular member. The cover 78 may be made of either a plastic or metal material. It should be appreciated that the cover 78 is disposed between the base portions 40 and 32 of the upper anchors 38 and the lower anchor 26.

When installed in the vehicle 14 as illustrated in FIG. 1, the tension sensing assembly 10 has the belt webbing 25 extending through the anchor portions 40 of the upper anchors 38. The tension assembly 10 has the anchor portion 28 of the lower anchor 26 connected to vehicle structure such as the floorplan, by suitable means such as an anchor bolt 80.

In operation of the tension sensing assembly 10, when the latch plate 22 is not latched with the buckle assembly 24, the Hall effect sensor 70 transmits a no tension signal.

When the occupant buckles the seat restraint system 12, the tension in the belt webbing 25 is lower than a predetermined load required to deflect the spring 62. In this state, the tension sensing assembly 10 will send an output signal to the controller. The controller uses the output signal for weight compensation along with a weight signal from a bladder (not shown) in the seat 18 to decide on deployment of an inflatable restraint (not shown). It should be appreciated that the seat restraint system 12 is in a low-tension condition. It should also be appreciated that the tension sensing assembly 10 function similar to a load cell to measure load and send the signal to the controller.

When a child seat (not shown) is placed in the seat 18 and the seat restraint system 12 is buckled, the belt webbing 23 is cinched to pull the child seat tightly into the seat 18. As the tension is increased in the belt webbing 25, the contact force on the upper anchors 38 via the belt webbing 25 increases. The resistive force of the springs 62 reacts against the increased tension. When the tension in the belt webbing 25 exceeds the predetermined load, the upper anchors 38 move as the springs 62 are stretched, thereby moving the magnets 66 relative to the Hall effect sensor 70 in a pull-pull arrangement. This movement changes the output of the Hall effect sensor 70. The translation of the magnets 66 is in proportion to the force due to the springs 62. The controller uses the output signal for weight compensation along with a weight signal from a bladder (not shown) in the seat 18 to decide on deployment of an inflatable restraint (not shown). It should be appreciated that the seat restraint system 12 is in a high-tension condition. It should also be appreciated that an audible tone or visual indication may be provided when the tension in the belt webbing 25 is increased above a predetermined level. It should further be appreciated that the tension sensing assembly 10 could be used as an analogue device.

Referring to FIGS. 6 and 7, another embodiment, according to the present invention, of the tension sensing assembly 10 is shown for the seat restraint system 12 in the vehicle. Like parts of the tension sensing assembly 10 have like reference numerals increased by one hundred (100). In this embodiment, the tension sensing assembly 110 reduces components by eliminating the upper anchors, cover, and one magnet, while reducing package height. The tension sensing assembly 110 includes the lower anchor 126 as a strap having the anchor portion 128 and aperture 130. The lower anchor 126 also includes the base portion 132 and the tongue portion 134 with the slot 136. The tension sensing assembly 110 also includes a movable mechanism 196 comprising a housing 190 and a buckle frame 180 of the buckle assembly 24. The buckle frame 180 has a base wall 182 and a pair of opposed side walls 184 extending generally perpendicular to the base wall 182. The buckle frame 180 includes a tongue portion 186 extending longitudinally from the base wall 182 and having an aperture 187 extending therethrough for a function to be described. The tongue portion 186 also has a pair of opposed recesses 188 for a function to be described.

The housing 190 of the tension sensing assembly 110 cooperates with the buckle frame 180 and the lower anchor 126. The housing 190 is generally rectangular in shape and is made of a die-cast material. The housing 190 has an aperture 191 extending therethrough for a function to be described. The housing 190 also includes a pair of opposed tabs 192 extending outwardly therefrom to be received in the recesses 188 of the buckle frame 180.

The tension sensing assembly 110 also includes a housing 190 to cooperate with the buckle frame 180 and the lower anchor 126. The housing 190 is generally rectangular in shape and is made of a die-cast material. The housing 190 has an aperture 191 extending therethrough for a function to be described. The housing 190 also includes a pair of opposed tabs 192 extending outwardly therefrom to be received in the recesses 188 of the buckle frame 180.

The tension sensing assembly 110 includes the fastener 154 to secure the housing 190 and lower anchor 126 together. The fastener 154 has the head portion 156 and the shaft portion 158. The shaft portion 158 extends through the aperture 191 in the housing 190, the slot 136 in the lower anchor 126, and the aperture 187 in the buckle frame 180. It should be appreciated that the fastener 154 is fixed to the housing 190 and buckle frame 180 and the slot 136 in the lower anchor 126 allows for longitudinal motion of the lower anchor 126 relative to the housing 190 and buckle frame 180.

The tension sensing assembly 110 includes the spring mounts 160 extending longitudinally from the buckle frame 180 and the lower anchor 126. The buckle frame 180 has a pair of spring mounts 160 spaced laterally on the base wall 182 and the lower anchor 126 has a pair of spring mounts 160 spaced laterally on the base portion 128.

The tension sensing assembly 110 also includes the springs 162 extending between the buckle frame 180 and the lower anchor 126. The springs 162 have a first end connected to the spring mounts 160 of the lower anchor 126 by suitable means such as spring crimps 164 and a second end connected to the spring mounts 160 of the buckle frame 180 by suitable means such as spring crimps 164. It should be appreciated that the springs 162 are tensioned when the lower anchor 126 is moved relative to the buckle frame 180 and housing 190.

The tension sensing assembly 110 includes a magnet 166 disposed in a recess 193 of the housing 190. The magnet 166 is die-cast into the housing 190 and charged during assembly.

The tension sensing assembly 110 also includes the Hall effect sensor 170 disposed in a recess 172 of the tongue portion 134 of the lower anchor 126. The Hall effect sensor 170 is mounted on the printed circuit board 174 connected to the base portion 132 and is potted or encapsulated and connected by electrical leads or wires 176 to a source of power such as a controller (not shown) of the vehicle. The Hall effect sensor 170 and magnet 166 are moved relative to each other during a high-tension condition. The operation of the tension sensing assembly 110 is similar to the tension sensing assembly 10.

Referring to FIG. 8, yet another embodiment, according to the present invention, of the tension sensing assembly 10 is shown for the seat restraint system 12 in the vehicle. Like parts of the tension sensing assembly 10 have like reference numerals increased by two hundred (200). In this embodiment, the tension sensing assembly 210 is integrated with the buckle assembly 24. The tension sensing assembly 210 includes a buckle frame 280 of the buckle assembly 24. The buckle frame 280 has a base wall 282 and a pair of opposed side walls 284 extending generally perpendicular to the base wall 282. The buckle frame 280 includes an aperture (not shown) extending through the base wall 282 for a function to be described.

The tension sensing assembly 210 also includes a housing 290 to cooperate with the buckle frame 280. The housing 290 is generally rectangular in shape. The housing 290 has an aperture (not shown) extending therethrough for a function to be described.

The tension sensing assembly 210 includes at least one, preferably a pair of cable anchors 292 extending longitudinally. Each cable anchor 292 has an anchor portion 293 that is generally planar and rectangular in shape. The anchor portion 293 has a mounting aperture (not shown) extending therethrough to act as a mounting hole for a function to be described. Each cable anchor 292 has a tongue portion 294 extending generally longitudinally from the anchor portion 293. The tongue portion 294 has an elongated slot (not shown) extending therethrough for a function to be described. Each cable anchor 292 is made of a metal material.

The tension sensing assembly 210 includes a fastener 295 to secure the cable anchors 292 together. The fastener 295 has a head portion 296 and a shaft portion (not shown). The shaft portion extends through the apertures in the cable anchors 292. The end of the shaft portion is expanded to form another head portion 296 on the other side of the cable anchors 292.

The tension sensing assembly 210 further includes a flexible cable 298 extending between the cable anchors 292 and cooperating with the cable anchors 292 for attachment to vehicle structure. The cable 298 is made of a flexible metal material such as steel. The cable 298 extends between the cable anchors 292 and about the fastener 295 and forms a generally arcuate portion about the fastener 295. The free ends of the cable 298 are disposed outside of the cable anchors 292 and may be attached to vehicle structure or to a pretensioner (not shown).

The tension sensing assembly 210 includes the fastener 254 to secure the housing 290, cable anchors 292, and buckle frame 280 together. The fastener 254 has the head portion 256 and the shaft portion 258. The shaft portion 258 extends through the aperture in the housing 290, the slot in the cable anchors 292, and the aperture in the buckle frame 280. It should be appreciated that the fastener 254 is fixed to the housing 290 and buckle frame 280 and the slot in the cable anchors 292 allows for longitudinal motion of the cable anchors 292 relative to the housing 290 and buckle frame 280.

The tension sensing assembly 210 includes the spring mounts 260 extending longitudinally from the buckle frame 280 and the cable anchors 292. The buckle frame 280 has a pair of spring mounts 260 speed laterally and extending from the side walls 284 and the cable anchors 292 have a pair of spring mounts 260 spaced laterally and extending from the anchor portion 293.

The tension sensing assembly 210 also includes the springs 262 extending between the buckle frame 280 and the cable anchors 292. The springs 262 have a first end connected to the spring mounts 260 of the cable anchors 292 by suitable means such as spring crimps 264 and a second end connected to the spring mounts 260 of the buckle frame 280 by suitable means such as spring crimps 264. It should be appreciated that the springs 262 are tensioned when the cable anchors 292 are moved relative to the buckle frame 280 and housing 290.

The tension sensing assembly 210 includes a magnet 266 disposed in a recess (not shown) of the housing 290. The magnet 266 is molded or die-cast into the housing 290 and charged during assembly.

The tension sensing assembly 210 also includes the Hall effect sensor 270 disposed in a recess (not shown) of the tongue portion 294 of the cable anchors 292. The Hall effect sensor 270 is mounted on the printed circuit board 274, which is connected to the base wall 282 of the buckle frame 280 and is potted or encapsulated and connected by electrical leads or wires (not shown) to a source of power such as a controller (not shown) of the vehicle. The Hall effect sensor 270 and magnet 266 are moved relative to each other during a high-tension condition. The operation of the tension sensing assembly 210 is similar to the tension sensing assembly 10.

Referring to FIG. 9, still another embodiment, according to the present invention, of the tension sensing assembly 10 is shown for the seat restraint system 12 in the vehicle. Like parts of the tension sensing assembly 10 have like reference numerals increased by three hundred (300). In this embodiment, the tension sensing assembly 310 is integrated with the buckle assembly 24. The tension sensing assembly 310 includes a buckle frame 380 of the buckle assembly 24. The buckle frame 380 has a base wall 382 and a pair of opposed side walls 384 extending generally perpendicular to the base wall 382. The buckle frame 380 includes an elongated slot (not shown) extending through the base wall 382 for a function to be described. It should be appreciated that the buckle frame 380 has a continuous "U" shaped cross-section to provide resistance to bending loads.

The tension sensing assembly 310 includes at least one, preferably a pair of anchors 338 extending longitudinally. Each anchor 338 has an anchor portion 340 that is generally planar and rectangular in shape. The anchor portion 340 has a mounting aperture 342 extending therethrough to receive the belt webbing 25. Each anchor 338 has a tongue portion 346 extending generally longitudinally from the anchor portion 340. The tongue portion 346 is generally rectangular in shape. The tongue portion 346 is disposed between the side walls 384 of the buckle frame 380, which provide guidance and side-to-side control of the anchors 338. The tongue portion 346 has an aperture 348 extending therethrough and a counterbore 349 disposed about the aperture 348 for a function to be described. Each anchor 338 is made of a metal material and overmolded with a plastic material to provide webbing protection and to protect bearing surfaces from environmental contamination. It should be appreciated that the overmold surfaces interface the buckle frame 380 for control of the relative motion and to provide a low friction surface for translation.

The tension sensing assembly 310 includes the fastener 354 to secure the anchors 338 and buckle frame 380 together. The fastener 354 has the head portion 356 and the shaft portion 358. The shaft portion 358 extends through the apertures 348 in the anchors 338 and the slot in the buckle frame 380. It should be appreciated that the fastener 354 is fixed to the anchors 338 and the slot in the buckle frame 380 allows for longitudinal motion of the anchors 338 relative to the buckle frame 280.

The tension sensing assembly 310 includes the spring mounts 360 extending longitudinally from the buckle frame 380 and the anchors 338. The buckle frame 380 has a pair of spring mounts 360 spaced laterally and extending from the side walls 384. Preferably, each anchor 338 has one spring mount 360 on one side thereof.

The tension sensing assembly 310 also includes the springs 362 extending between the buckle frame 380 and the anchors 338. The springs 362 have a first end connected to the spring mounts 360 of the anchors 338 by suitable means such as spring crimps 364 and a second end connected to the spring mounts 360 of the buckle frame 380 by suitable means such as spring crimps 364. It should be appreciated that the springs 362 are tensioned when the anchors 338 are moved relative to the buckle frame 380.

The tension sensing assembly 310 includes a magnet 366 disposed in a recess (not shown) of the tongue portion 346 of the anchors 338. The magnet 366 is molded or die-cast into the anchors 338 and charged during assembly.

The tension sensing assembly 310 also includes the Hall effect sensor 370 mounted on the printed circuit 374, which is connected to the base wall 382 of the buckle frame 380 and is potted or encapsulated and connected by electrical leads or wires (not shown) to a source of power such as a controller (not shown) of the vehicle. The Hall effect sensor 370 and magnet 366 are moved relative to each other during a high-tension condition. The load path of the tension load in the restraint system 12 is transferred through the seat belt webbing 23 to the latch plate 22, buckle latch, buckle frame 380, anchors 338, belt webbing 25, and to the buckle anchor. The operation of the tension sensing assembly 310 is similar to the tension sensing assembly 10.

During assembly, the buckle frame 380 is placed into an injection mold along with the printed circuit board 374 and an encapsulating material to create a subassembly. The printed circuit board 374 has the Hall effect sensor 370 along with resistors (not shown) and capacitors (not shown). It should be appreciated that the process of encapsulating the printed circuit board 374 onto the buckle frame 380 attaches, locates, and protects the Hall effect sensor 370.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A tension sensing assembly for a seat restraint system in a vehicle comprising:
   an anchor;
   a movable mechanism configured to be secured to a portion of a buckle, the movable mechanism having at least one aperture extending therethrough;
   at least one magnet coupled to the movable mechanism;
   a Hall effect sensor coupled to the anchor; and
   at least one tension spring secured to the anchor at a first end and the movable mechanism at a second end, the movable mechanism moving the at least one magnet relative to the Hall effect sensor to induce an output from the Hall effect sensor, the output indicating a tension level being applied to the tension sensing assembly.

2. A tension sensing assembly as set forth in claim 1, further comprising a fastener to connect the anchor and the movable mechanism together and allow relative motion therebetween.

3. A tension sensing assembly as set forth in claim 1, wherein the movable mechanism comprises a buckle frame of the buckle for the seat restraint system.

4. A tension sensing assembly as set forth in claim 1, wherein the movable mechanism comprises at least one anchor member.

5. A tension sensing assembly as set forth in claim 1, wherein the aperture comprises an elongated slot.

6. A tension sensing assembly as set forth in claim 1, wherein the anchor has an anchor portion and an aperture extending through the anchor portion.

7. A tension sensing assembly as set forth in claim 6, wherein the anchor has a tongue portion extending longitudinally from the anchor portion.

8. A tension sensing assembly as set forth in claim 7, wherein the tongue portion has an aperture extending therethrough.

9. A tension sensing assembly as set forth in claim 8, wherein the aperture comprises an elongated slot.

10. A tension sensing assembly as set forth in claim 1, wherein the movable mechanism and the anchor include at least one spring mount.

11. The tension sensing assembly as in claim 1, wherein the movable mechanism comprises a pair of anchors and the at least one magnet comprises a first magnet and a second magnet, the first magnet being coupled to one of the pair of anchors and the second magnet being coupled to the other one of the pair of anchors and the first magnet and the second magnet are disposed on either side of the Hall effect sensor.

12. A tension sensing assembly, comprising:
   an anchor;
   a movable mechanism configured to be secured to a portion of a buckle, the movable mechanism and the anchor having at least one spring mount;
   at least one magnet coupled to the movable mechanism;
   a Hall effect sensor coupled to the anchor;
   at least one tension spring secured to the anchor at a first end and the movable mechanism at a second end, the movable mechanism moving the at least one magnet relative to the Hall effect sensor to induce an output of from the Hall effect sensor, the output indicating an amount of tension being applied to the tension sensing assembly; and
   a plurality of spring crimps for connecting the at least one tension spring to the at least one spring mount of the movable mechanism and the anchor.

13. A tension sensing assembly as set forth in claim 1, further comprising a cover disposed over a portion of the movable mechanism and the anchor.

14. A tension sensing assembly as set forth in claim 1, wherein the movable mechanism includes a housing.

15. A tension sensing assembly as set forth in claim 14, wherein the housing comprises a die-cast material.

16. A seat restraint system for a vehicle comprising:
   a first anchor;
   a second anchor configured to be secured to a seat belt webbing;
   a fastener coupling the first anchor to the second anchor to allow relative movement therebetween;

at least one magnet coupled to the second anchor;

a Hall effect sensor coupled to the first anchor; and a plurality of tension springs each being secured to the first anchor at a first end and the second anchor at a second end, the second anchor moving the at least one magnet relative to the Hall effect sensor to when a tension is applied to the second anchor and the movement of the at least one magnet induces an output from the Hall effect sensor, the output indicating a tension level being applied to the tension sensing assembly.

* * * * *